United States Patent
Mornacchi et al.

(10) Patent No.: US 12,429,114 B2
(45) Date of Patent: Sep. 30, 2025

(54) DUAL LOAD PATH ACTUATOR

(71) Applicant: Microtecnica S.r.l., Turin (IT)

(72) Inventors: Andrea Mornacchi, Turin (IT); Simone Allevi, Appignano Del Tronto (IT); Domenico Tafuni, Turin (IT); Enrico Quaglia, Turin (IT); Dario Savino, Vercelli (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 18/978,644

(22) Filed: Dec. 12, 2024

(65) Prior Publication Data
US 2025/0207657 A1    Jun. 26, 2025

(30) Foreign Application Priority Data

Dec. 22, 2023    (EP) ..................................... 23220153

(51) Int. Cl.
*F16H 57/01*    (2012.01)
*F16H 1/28*    (2006.01)
(Continued)

(52) U.S. Cl.
CPC .............. *F16H 1/28* (2013.01); *F16H 57/01* (2013.01); *B64C 13/505* (2018.01);
(Continued)

(58) Field of Classification Search
CPC ...... F16H 1/28; F16H 57/01; F16H 2057/012; F16H 2057/018; B64C 13/505; B64D 45/0005
See application file for complete search history.

(56) References Cited

U.S. PATENT DOCUMENTS 4,441,675 A    4/1984   Boehringer et al.
8,336,817 B2   12/2012  Flatt
(Continued)

FOREIGN PATENT DOCUMENTS

CN    116014969 A    4/2023
EP     1731421 B1    8/2008
(Continued)

OTHER PUBLICATIONS

Machine translation of CN 116014969 A (Year: 2023).*
European Search Report for Application No. 23220153.3, mailed Aug. 14, 2024, 15 pages.

*Primary Examiner* — Farhana Pervin
(74) *Attorney, Agent, or Firm* — CANTOR COLBURN LLP

(57) ABSTRACT

An actuator includes a first transmission shaft mounted to a driver, a second transmission shaft mounted to the driver, and an output shaft. The output shaft includes a first engagement feature and the second transmission shaft comprises a second engagement feature for engaging with the first engagement feature. In a functioning condition, the first transmission shaft transmits drive from the driver to the output shaft, the second transmission shaft does not transmit drive from the driver to the output shaft, and the first engagement feature is rotationally separated from the second engagement feature by a predetermined angular gap. In a permitted failure condition, the first engagement feature engages the second engagement feature to transmit drive from the driver to the output shaft.

19 Claims, 4 Drawing Sheets

(51) Int. Cl.
*B64C 13/50* (2006.01)
*B64D 45/00* (2006.01)

(52) U.S. Cl.
CPC .... *B64D 45/0005* (2013.01); *F16H 2057/012* (2013.01); *F16H 2057/018* (2013.01)

(56) References Cited

U.S. PATENT DOCUMENTS

| | | | |
|---|---|---|---|
| 8,336,818 | B2 | 12/2012 | Flatt |
| 8,360,186 | B2 * | 1/2013 | Yamamoto .......... B60K 7/0007 74/606 A |
| 9,809,301 | B2 | 11/2017 | Chavignier et al. |
| 10,065,728 | B2 | 9/2018 | Cyrot |
| 10,132,724 | B2 | 11/2018 | Moulon et al. |
| 11,628,926 | B2 | 4/2023 | Polcuch |
| 11,662,001 | B2 | 5/2023 | Leipprandt et al. |
| 11,787,528 | B2 | 10/2023 | Liu et al. |
| 2011/0036605 | A1 * | 2/2011 | Leong ................... B25F 5/001 173/47 |
| 2015/0211424 | A1 * | 7/2015 | Nomura ................ F02D 41/04 123/472 |
| 2022/0307583 | A1 | 9/2022 | Hisai et al. |
| 2023/0228317 | A1 | 7/2023 | Zhu et al. |
| 2024/0269819 | A1 * | 8/2024 | Li ........................ B25F 5/001 |

FOREIGN PATENT DOCUMENTS

| | | |
|---|---|---|
| EP | 4107059 A1 | 12/2022 |
| WO | 2021165896 A1 | 8/2021 |

* cited by examiner

DUAL LOAD PATH ACTUATOR

CROSS-REFERENCE TO RELATED APPLICATIONS

This application claims the benefit of European Patent Application No. 23220153.3 filed Dec. 22, 2023, the disclosure of which is incorporated herein by reference in its entirety.

TECHNICAL FIELD

The invention relates to actuators, more particularly to rotary actuators for flight control systems.

BACKGROUND

In aircraft (aeroplanes, helicopters, unmanned aerial vehicles and the like) the control surfaces make it possible to modify the flow of air on the surface of the aircraft, so as to control the position of the aircraft in space. For example, aeroplane control surfaces may comprise flight control surfaces which are actuated during flight phases or during the phases of takeoff and landing. Among the flight control surfaces, ailerons located at the ends of the wing of the aeroplane make it possible to control the roll altitude of the aeroplane.

These flight control surfaces are pivotally mounted and each control surface can be actuated mechanically by an actuator accommodated in the wing of the aeroplane. The actuation of a plurality of control surfaces (e.g., a plurality of flaps) can be provided by one or more centrally located actuators whose action on the control surfaces can be synchronised by mechanical means (see, for example, U.S. Pat. No. 4,441,675A). It may also be practicable to use electromechanical control actuators to operate control surfaces individually.

In the event of failure of an actuator, there exists a risk that the control surface is found to be "floating". This type of failure would cause a loss of control of the aeroplane and would consequently constitute a catastrophic event. Accordingly, established civil aeronautical standards require fail safe and redundant systems to prevent such catastrophic failures. It is desirable to reduce the weight and use of space of the actuators, so as to be able to accommodate them in the wing of an aeroplane.

New developments in advance air mobility and urban air mobility platforms are also pursuing an approach to actuation systems that deviates from established civil aeronautical standards. The majority of platforms for advance air mobility and urban air mobility are based on distributed and redundant flight control system architectures wherein a plurality of smaller actuation systems may be used instead of one or a few central systems.

Redundancy is typically achieved by the provision of redundant surfaces (i.e., multiple control surfaces which have the same function) or redundant actuators. Providing redundant surfaces allows for the loss of a single surface to be permitted (e.g., until landing or the next scheduled maintenance) as this is a non-catastrophic failure of the system as a whole. Catastrophic failure would occur only in the event of free floating (when all redundancies fail).

The transition to a distributed architecture, and therefore to a high number of actuators, faces new challenges to offer actuators that guarantee performance, required safety levels and are cost effective.

There is, therefore, a need to provide an improved actuator.

SUMMARY

In an aspect there is provided an assembly for an actuator. The assembly comprises a first transmission shaft mounted to a driver (e.g., a driver for providing rotational movement) for rotation around an axis of rotation, a second transmission shaft mounted to the driver for rotation around the axis of rotation (e.g., coaxially and/or concentric with the first transmission shaft), and an output shaft. The first transmission shaft is secured to the output shaft for rotation with the output shaft around the axis of rotation. The output shaft comprises a first engagement feature and the second transmission shaft comprises a second engagement feature arranged to engage with the first engagement feature upon rotation of the second transmission shaft relative to the output shaft. The first engagement feature is separated from engagement with the second engagement feature.

In another aspect there is provided a planetary gear assembly for an actuator. The planetary gear assembly comprises a first gear carrier including a first transmission shaft mounted for rotation around an axis of rotation; a second gear carrier including a second transmission shaft mounted for rotation around the axis of rotation (e.g., coaxially and/or concentric with the first transmission shaft); a plurality of pins circumferentially spaced around the axis of rotation, wherein the plurality of pins are mounted to the first gear carrier and the second gear carrier; a plurality of planetary gears mounted to the plurality of pins, wherein each respective planetary gear is mounted to a respective pin for rotation about a respective pin axis; and an output shaft. The first transmission shaft is secured to the output shaft for rotation with the output shaft around the axis of rotation. The output shaft comprises a first engagement feature and the second transmission shaft comprises a second engagement feature arranged to engage with the first engagement feature upon rotation of the second transmission shaft relative to the output shaft. The first engagement feature is separated from engagement with the second engagement feature.

In another aspect there is provided an electric motor assembly for an actuator. The electric motor assembly comprises a stator; a rotor mounted for rotation with respect to the stator around an axis of rotation; a first transmission shaft mounted to the rotor; a second transmission shaft mounted to the rotor (e.g., coaxially and/or concentric with the first transmission shaft); and an output shaft. The rotor is configured to drive (e.g., provide rotational movement to) the first transmission shaft and second transmission shaft around the axis of rotation. The first transmission shaft is secured to the output shaft for rotation with the output shaft around the axis of rotation. The output shaft comprises a first engagement feature and the second transmission shaft comprises a second engagement feature arranged to engage with the first engagement feature upon rotation of the second transmission shaft relative to the output shaft. The first engagement feature is separated from engagement with the second engagement feature.

The electric motor assembly may comprise one or more fasteners securing the first transmission shaft and the second transmission shaft to the rotor.

In any of the above aspects, in a functioning condition (e.g., a "fully" functional condition absent the failure of the first transmission shaft), the first transmission shaft is arranged to transmit drive from the driver (e.g., a rotor or planetary gear carrier and/or pins) to the output shaft, the second transmission shaft is arranged so that it does not transmit drive from the driver to the output shaft, and the first engagement feature is rotationally separated from the second engagement feature by a predetermined angular gap (e.g., a circumferential spacing).

In any of the above aspects, in the permitted failure condition (e.g., when the first transmission shaft has failed or is arranged so that it does not or is ineffective to transmit drive from the driver to the output shaft), the second transmission shaft is arranged so that it transmits drive from the driver to the output shaft, and the first engagement feature is engaged with the second engagement feature so as to transmit drive from the driver to the output shaft.

In another aspect there is provided a method for detecting a permitted failure condition of an actuator, the actuator comprising an assembly of any of the previous aspects. The method comprises: determining a position of the output shaft relative to a position of the driver; comparing the determined position of the output shaft (e.g., an angular or rotational position) with an expected position of the output shaft (e.g., an expected angular or rotational position); determining that the permitted failure condition has occurred if the determined position of the output shaft and the expected position of the output shaft are offset from each other by the predetermined angular gap.

The following optional features may be applied to any of the above aspects.

The first engagement feature may be separated from engagement with the second engagement feature by an angular gap (e.g., a predetermined angular gap or spacing providing a known angular offset or spacing between the first engagement feature and the second engagement feature).

The output shaft may comprise an output gear.

The output shaft may be integral with the first transmission shaft (e.g., when in a functioning condition).

The output shaft may be is radially exterior to the second transmission shaft.

One of the first engagement feature and the second engagement feature may comprise a projection (e.g., a radially extending projection extending radially inwardly or outwardly).

One of the first engagement feature and the second engagement feature (e.g., the other of the first engagement feature and the second engagement feature) may comprise a circumferential slot (e.g., a vacancy or depression defined between two circumferential side walls).

The circumferential slot may be configured (e.g., sized and/or shaped) to receive the projection.

An angular gap (e.g., a circumferential spacing) may extend between the projection and the circumferential slot (e.g., between a side (circumferential side) of the projection and a side (circumferential side) of the slot).

In another aspect there is provided an actuator comprising any of the above aspects and/or any of the above optional features.

The actuator may comprise a planetary gear assembly according to the above aspects.

The actuator may comprise an electric motor assembly according to the above aspects.

The actuator may comprise an actuation shaft (e.g., an output shaft of the actuator as a whole).

The output shaft of the electric motor assembly may be connected to a sun gear.

The actuator may additionally or alternatively comprise an electric motor having a stator and a rotor, wherein the rotor is connected to a sun gear.

The sun gear may drive the plurality of planetary gears around the axis of rotation. The output shaft of the planetary gear assembly may be connected to the actuation shaft.

The actuator may comprise one or more sensors configured to determine the angular or rotational position of the actuation shaft relative to the rotor.

The actuator may comprise a controller configured to determine that the first transmission shaft (e.g. of the electric motor assembly or a planetary gear assembly) has failed and that the second transmission shaft (e.g. of the electric motor assembly or a planetary gear assembly) is engaged with, and transmits drive to, the actuation shaft based on the determined rotational position the actuation shaft.

The actuator may comprise a plurality of planetary gear assemblies according to the above aspects, wherein the separation of each respective first and second engagement features of each planetary gear assembly is different.

The actuator may comprise a first planetary gear assembly according to the above aspect having a first angular separation or gap between a respective first and second engagement feature.

The actuator may comprise a second planetary gear assembly according to the above aspect having a second angular separation or gap between a respective first and second engagement feature.

The actuator may comprise an electric motor assembly according to the above aspect having a third angular separation or gap between a respective first and second engagement feature.

The first angular separation or gap may be different (e.g., have a different angular value) to the second angular separation or gap or the third angular separation or gap.

The actuator may comprise a feedback shaft secured to the actuation shaft. The feedback shaft may be coaxial with the rotor. A portion of the feedback shaft may extend through a portion of the rotor.

The method may comprise recalibrating the actuator based on a determining that a permitted failure condition has occurred (e.g., to compensate for the predetermined offset).

Embodiments will now be described, by way of example only, with reference to the drawings.

DETAILED DESCRIPTION

Figure 1:
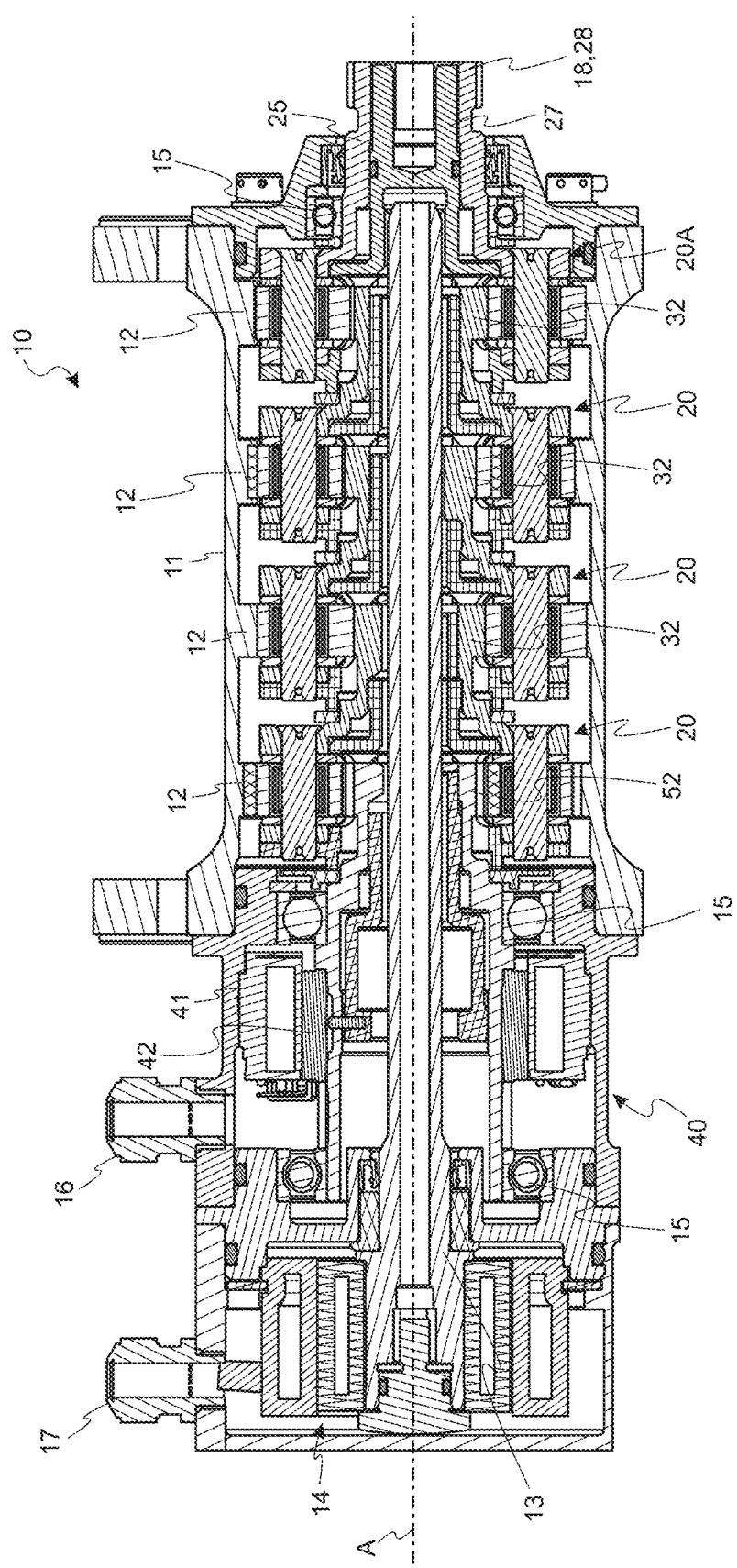
FIG. 1 shows a side section view of an actuator.

In an example (e.g., as shown in FIG. 1), an actuator 10 (e.g., electromechanical actuator or rotary actuator) is provided to respond to safety and fail condition requirements. The actuator 10 includes a dual load path between its input (e.g., a driver) and its output (e.g., an output shaft 18). The dual load path is provided as part of a transmission system of the actuator 10. The dual load path may be provided as part of a transmission or drive system of a motor 40 (e.g., an electric motor assembly), or the dual load path may be provided as part of a transmission system of an intervening gearbox between the input and output of the actuator 10. That is, the actuator 10 may be provided with a dual load path motor 40 and/or a dual load path gear arrangement. In the example shown in FIG. 1, the actuator 10 is provided with a dual load path motor 40 and a multistage epicycle gearbox with dual load paths for each stage (four stages are presented in FIG. 1, but alternative numbers could be used, for example, a single-stage gearbox).

In examples, a dual load path is provided with a first or primary transmission shaft, a second or secondary transmission shaft and an output shaft. Both of the first transmission shaft and the second transmission shaft may be secured to a driver (as used herein, "driver" means a rotational driving means arranged to rotate the first transmission shaft and the second transmission shaft about a common axis of rotation A). In normal use, the first transmission shaft may be connected or secured to the output shaft so as to transmit drive or rotational movement from the driver to the output shaft, and the second transmission shaft may be operatively disconnected from the output shaft (e.g., arranged so that it does not transmit drive or rotational movement to the output shaft). Each of the output shaft and the second transmission shaft may comprise a respective engagement feature (e.g., a first engagement feature such as a projection and a second engagement feature such as a circumferential slot) which are disengaged from each other (i.e., in an idle state where no drive is transmitted) whilst the first transmission shaft is connected to the output shaft. The first and second engagement features may be configured to engage with each other so as to transmit drive from the second transmission shaft to the output shaft in the event of failure of the first transmission shaft. The first engagement feature may initially be separated from engagement with the second engagement feature (e.g., the first and second engagement features may be axially aligned and circumferentially spaced). The separation may be provided by a predetermined spacing or angular gap or spacing providing a predetermined angular offset between the first engagement feature and the second engagement feature. Upon failure of the first transmission shaft, the second transmission shaft may rotate relative to the output shaft such that the first engagement feature is moved (e.g., rotated) into engagement with the second engagement feature (or vice versa). The second transmission shaft may then transmit drive or rotational movement to the output shaft and the output shaft may be angularly offset from the driver or first transmission shaft by the predetermined angular offset (relative to the would-be angular or rotational position of the output shaft absent the failure of the first transmission shaft). Referring to the multi-stage epicycle gearbox shown in FIG. 1, each stage includes a sun gear 32, 52 (an input gear) connected to a driver or driving force (e.g., a rotor 42 of an electric motor assembly 40, or a preceding gear stage), a planetary gear assembly 20 and a ring gear 12 (in the example shown, the ring gear 12 is integral with a housing 11 of the actuator 10).

Figure 2A:
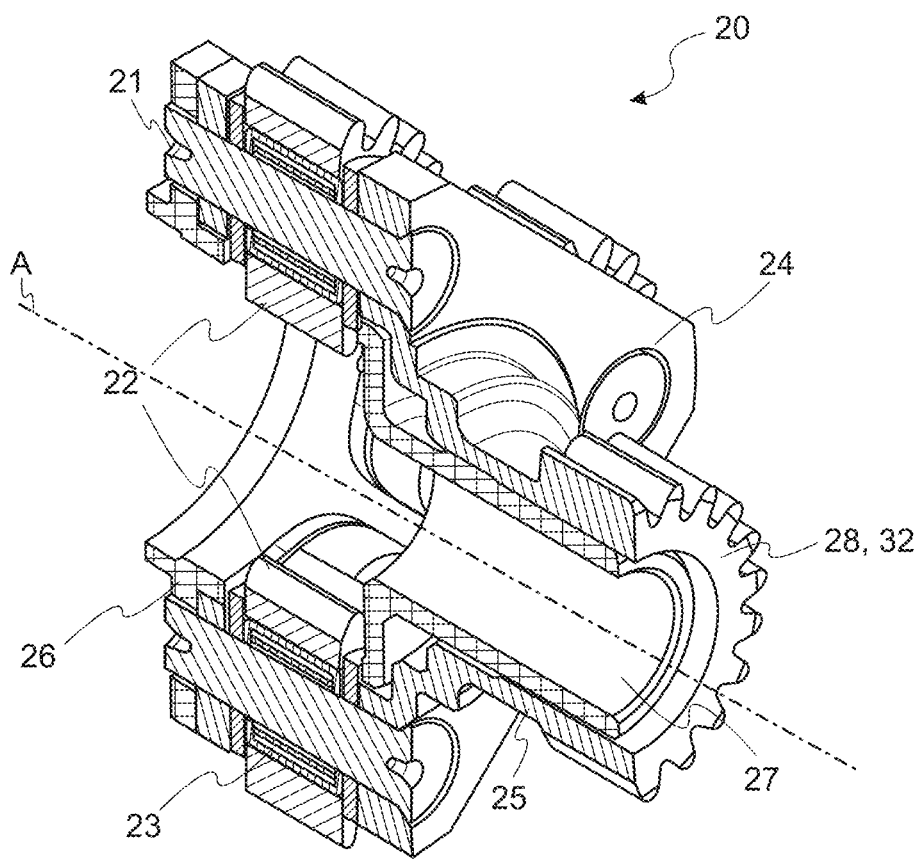
FIG. 2A shows a perspective section view of a planetary gear assembly.
Figure 2B:
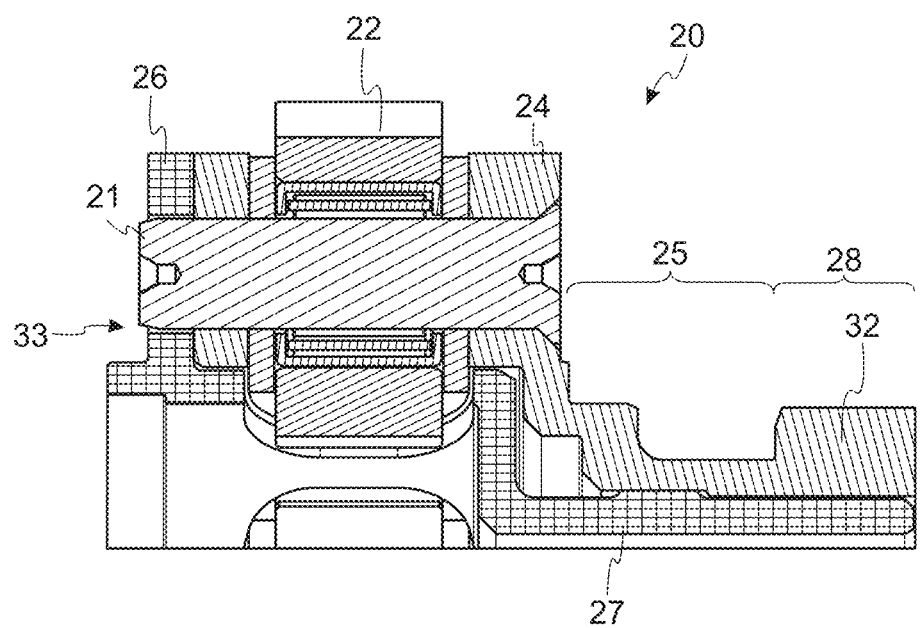
FIG. 2B shows a partial side section view of the planetary gear assembly of FIG. 2A.

The planetary gear assembly 20 of each stage (see FIG. 2A) includes a plurality of planetary gears 22 mounted to a plurality of pins 21, each respective planetary gear 22 being mounted to a respective pin 21 for rotation about a respective pin axis. The gears 22 may be provided with bearings 23 (e.g., a bearing surface or roller bearings) to allow the gears 22 to rotate about the pin axes whilst drive is transmitted from the gears 22 to the pins 21. The pins 21 are connected to and held by a first or primary gear carrier 24 including a first or primary transmission shaft 25. The first transmission shaft 25 is arranged to transmit drive to the output of the actuator 10. For example, the first transmission shaft 25 may be secured to, or integral with, an output shaft 28 of the gear stage. The output shaft 28 may act as input to a subsequent stage of a multi-stage gearbox, or it may be secured to, or integral with, an output of the actuator 10 as a whole (e.g., an actuator shaft or actuator output shaft 18). The output shaft 28 may comprise a gear (e.g., a sun gear 32 or actuator gear for subsequent interaction with a control surface).

With reference to FIGS. 2A to 4, the planetary gear assembly 20 includes a second or secondary gear carrier 26 including a second or secondary transmission shaft 27. The second gear carrier 26 is also connected to or arranged to surround the pins 21. A small annular clearance may be provided between the pins 21 and the second gear carrier 26 (e.g., between each respective pin 21 and a respective aperture in the second gear carrier 26 for holding the pin 21). The annular clearance forms a radial gap (e.g., a calibrated gap 33). The radial gap 33 may be provided to allow a small degree of floating between the first gear carrier 24 and the second gear carrier 26. The second transmission shaft 27 extends coaxially with the first transmission shaft 25. In the example shown, the first transmission shaft 25 is hollow and the second transmission shaft 27 extends axially within the first transmission shaft 25.

The second transmission shaft 27 may be operatively disconnected from the output shaft 28 (e.g., arranged so as not to transmit drive to the output shaft 28) whilst the first transmission shaft 25 is connected to the output shaft 28 (i.e., whilst the first transmission shaft 25 is arranged to transmit drive to the output shaft 28). Each of the output shaft 28 and the second transmission shaft 27 may comprise a respective engagement feature (e.g., a first engagement feature 30 and a second engagement feature 29) which are disengaged from each other (i.e., in an idle state where no drive is transmitted) whilst the first transmission shaft 25 is connected to the output shaft 28. The engagement features 29, 30 may be configured to engage with each other so as to transmit drive from the second transmission shaft 27 to the output shaft 28 in the event of failure of the first transmission shaft 25 or first gear carrier 24. The first engagement feature 30 may initially be separated from engagement with the second engagement feature 29.

In the examples shown, the first engagement feature 30 is a projection or tooth and the second engagement feature 29 is a circumferential slot. The projection 30 is located within the slot 29. The slot 29 is provided in the outer circumference of the second transmission shaft 27, whist the projection 30 is provided on a radially inner surface of the output shaft 28 (e.g., a projection or tooth machined in the inner diameter of an output gear). Alternatively, the slot may be provided in the output shaft 28 and the projection may extend from a radially outer surface of the second transmission shaft 27.

The disconnect or separation between the projection 30 and the slot 29 (e.g., a side or edge of the slot) are ensured by an angular gap or spacing 31 (e.g., a circumferential spacing) which is calibrated to provide a set or predetermined angular offset between the projection 30 and the (side or edge of the) slot 29. The angular gap 31 may be sized to be larger than the radial gap 33 between the pins 21 and the second gear carrier 26, if present (i.e., any angular offset caused by the annular or radial gap 33 may be sized to be smaller than an angular offset caused by the angular gap 31).

An angular gap 31 may be provided on both sides of the projection 30 such that the offset is present in both a forward direction of movement (e.g., a clockwise rotation) and a rearward direction of movement (e.g., an anticlockwise rotation). The angular gaps 31, and therefore the offset between the projection 30 and the sides of the slot 29, may be the same on both sides of the projection 30, or the angular gaps 31 may be different on the different sides of the projection 30 (e.g., such that the offset for a forward direction of movement is different from the offset for a rearward direction of movement).

Figure 5:
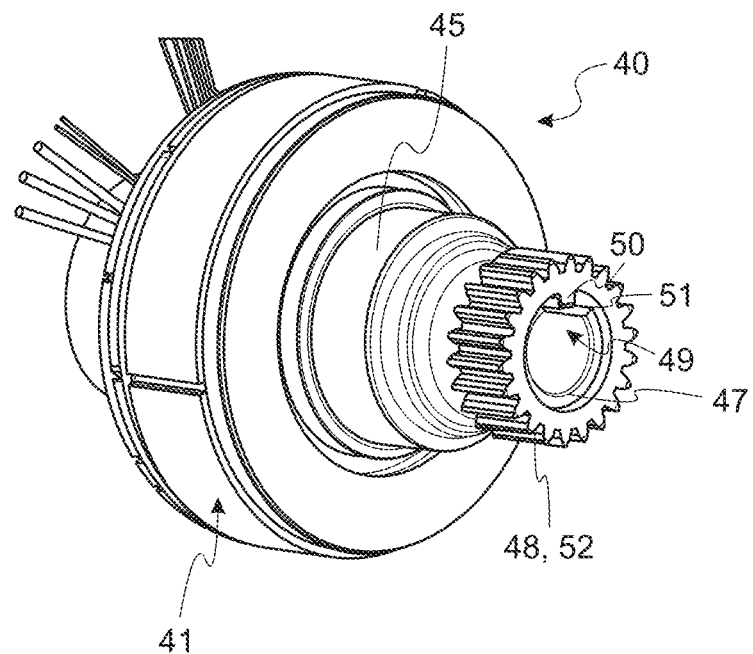
FIG. 5 shows a perspective view of an electric motor assembly.
Figure 6:
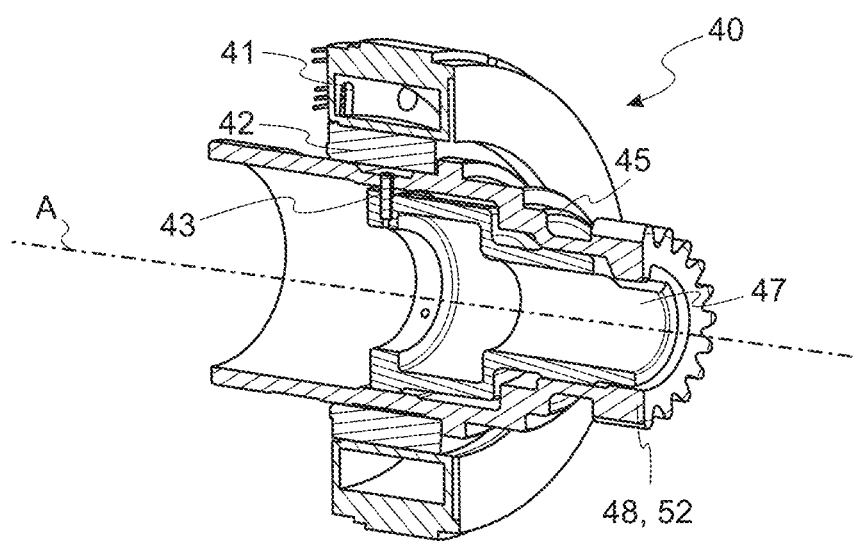
FIG. 6 shows a perspective section view of the electric motor assembly of FIG. 5.

With reference to FIGS. 5 and 6, the dual load path may also be provided by, or extend from, the motor 40 itself (e.g., to the output shaft 48 of the electric motor assembly 40). That is, a coaxial shaft assembly may be provided with a first or primary transmission shaft 45 (e.g., a first drive shaft), a second or secondary transmission shaft 47 (e.g., a second drive shaft) and an output shaft 48 (e.g., secured to an output gear 52). Both of the first transmission shaft 45 and the second transmission shaft 47 may be secured to a rotor 42 (e.g., a common rotor element of the motor 40) by one or more fasteners 43. The rotor 42 may be arranged to rotate relative to a stator 41 on one or more bearings 15 about a common axis of rotation A under the control of a positional controller (not shown) configured to set the position of the rotor 42 (e.g., an angular or rotational position of the rotor 42). The one or more fasteners 43 may collectively secure both transmission shafts 45, 47 to the rotor 42 (e.g., a common fastener 43 or pin may extend through both transmission shafts 45, 47 to transfer motion and torque to both in unison). Alternatively, dedicated fasteners may separately and individually secure each of the first and second transmission shafts 45, 47 to the rotor 42.

The first and second transmission shafts 45, 47 may be configured and operate substantially as described above for the first and second transmission shafts 25, 27 the planetary gear assembly 20. That is, in normal use, the second transmission shaft 47 of the motor 40 may be operatively disconnected from the output shaft 48 of the motor 40 by an arrangement substantially as described above (i.e., it may be idle). Each of the output shaft 48 and the second transmission shaft 47 of the motor 40 may comprise a respective engagement feature (e.g., a first engagement feature 50 such as a projection and a second engagement feature 49 such as a circumferential slot) which are disengaged from each other (i.e., in an idle state where no drive is transmitted) whilst the first transmission shaft 45 is connected to the output shaft 48 so as to transmit drive from the rotor 42. The engagement features 49, 50 may be configured to engage with each other so as to transmit drive from the second transmission shaft 47 to the output shaft 48 in the event of failure of the first transmission shaft 45. The first engagement feature 50 may initially be separated from engagement with the second engagement feature 49 (e.g., the first and second engagement features may be axially aligned and circumferentially spaced). The separation may be provided by a predetermined spacing or angular gap 51 providing a predetermined angular offset between the first engagement feature 50 and the second engagement feature 49 and associated second transmission shaft 47 and output shaft 48.

As noted above, the dual load path of the motor 40 may be provided in addition to one or more dual load paths of epicyclic gear stages, or in alternative thereto. For example, the actuator may comprise only a motor 40 with a dual load path and no gearbox. Alternatively, the actuator 10 may comprise a motor 40 with a dual load path and a gearbox without a dual load path. In another example, the actuator 10 may comprise a motor 40 without a dual load path and a gearbox with one or more dual load paths.

During normal operation, the output shaft (e.g., the output shaft 48 of the motor 40, the output shaft 28 of a planetary gear assembly 20, or the output shaft 18 of the actuator 10) may be driven by the first transmission shaft 25, 45 alone and the separation of the first and second engagement features 29, 30, 49, 50 may be maintained. In this way torque is transmitted by the primary load path (by the first gear carrier 24 and/or first transmission shaft(s) 25, 45) and the primary and secondary load paths (first and second transmission shaft(s) 25, 27, 45, 27) rotate at the same speed. For example, as motion and torque are input to the epicycle stage from a sun gear 32, 52 (e.g., a sun gear 32 of a previous stage or a sun gear 52 secured to a motor 40), the sun gear 32, 52 engages with the plurality of planetary gears 22 which also engage with a ring gear 12 machined or otherwise formed in the actuator body or housing 11. The motion is then transferred to the first gear carrier 24 and the second gear carrier 26 through the pins 21 holding the planetary gears 22. Torque or load is then transmitted to the output (e.g., the output shaft 18 of the actuator 10) along the primary load path only through a direct connection (e.g., an integral connection) from the first gear carrier 24 to the output. Since, in normal operation, both carriers 24, 26 and/or both first and second transmission shafts 25, 27, 45, 27 are arranged to run at the same speed, the projection 30, 50 remains in the middle of the slot 29, 50 in the respective output shaft 28, 48.

When a failure of the primary load path occurs (e.g., when a fracture occurs in the first gear carrier 24 or a first transmission shaft 25, 45), the first gear carrier 24 or rotor 42 will no longer transmit torque and motion to the output (e.g., a first sun gear 52 secured to the motor or a second sun gear 32 mounted or secured to the output shaft 28 of the planetary gear assembly 20). The parts upstream of the failure (e.g., the rotor 42, the sun gear 32, 52 and/or planetary gears 22) continue to rotate at the nominal speed while the parts downstream (e.g., the output shaft 28) remain stationary as they no longer receive torque. The differential speed results in a displacement of the slot 29, 49 in the secondary transmission shaft 27, 47 relative to the projection 30, 50 of the output shaft 28, 48 (e.g., the secondary load path must recover the angular gap 31, 51). When the edges of the slot 29, 49 reach the projection 30, 50 (e.g., one of the flanks or sides of the projection 30, 50), the torque is transferred from the planetary gears 22 or rotor 42 to the output (e.g. the next stage of the multi stage epicycle gearbox) via the secondary load path (e.g., via the second gear carrier 26 and/or second transmission shaft 27, 47).

Such a failure of the primary load path and subsequent engagement of the secondary load path may be termed a "permitted failure" or non-catastrophic failure, as the system will continue to safely function (e.g., a type of failsafe condition wherein function is maintained despite the failure). This is in contrast to a catastrophic failure wherein no load path is maintained, and the output (e.g., the output shaft 28 or a subsequent control surface) is free-floating. In the case wherein a combination of dual load path motor 40 and dual load path gearbox, or a multistage epicyclic gear box is used, a multiple of permitted failures may be allowed to occur (e.g., in a multiple of the stages), without a catastrophic event (e.g., without a free-floating condition).

In examples, a system and method is provided for detecting a permitted failure (e.g., the failure of a primary load path and a switch to a secondary load path) and catastrophic failures. In order to detect permitted failures, the actuator 10 may comprise one or more sensors 14 to determine the relative positions (e.g., relative angular or rotational positions) on the output of the actuator (e.g., the output shaft 18) and the input of the actuator (e.g., a driver such as a rotor 42 of a motor 40). A controller (not shown) may be used to compare a detected or determined position of an output shaft 18, 28 with an expected position of the output shaft 18, 28 (e.g., an expected angular or rotational position based on an input control signal from the controller). Based on the comparison, the controller may determine that a permitted failure condition has occurred if the determined position of the output shaft 18, 28 and the expected position of the output shaft 18, 28 is offset by the predetermined or set angular offset (e.g., of the angular gap 31). Similarly, the one or more sensors 14 may be used to detect a catastrophic failure by determining that the output is free-floating or offset from the input by some other value not equal to the predetermined or set angular offset. In the absence of any fractures, breakages other failures, the position provided by the one or more sensors 14 will be harmonised with the position of the rotor 42 (net of the reduction ratio of the gearbox, if any).

Figure 3:
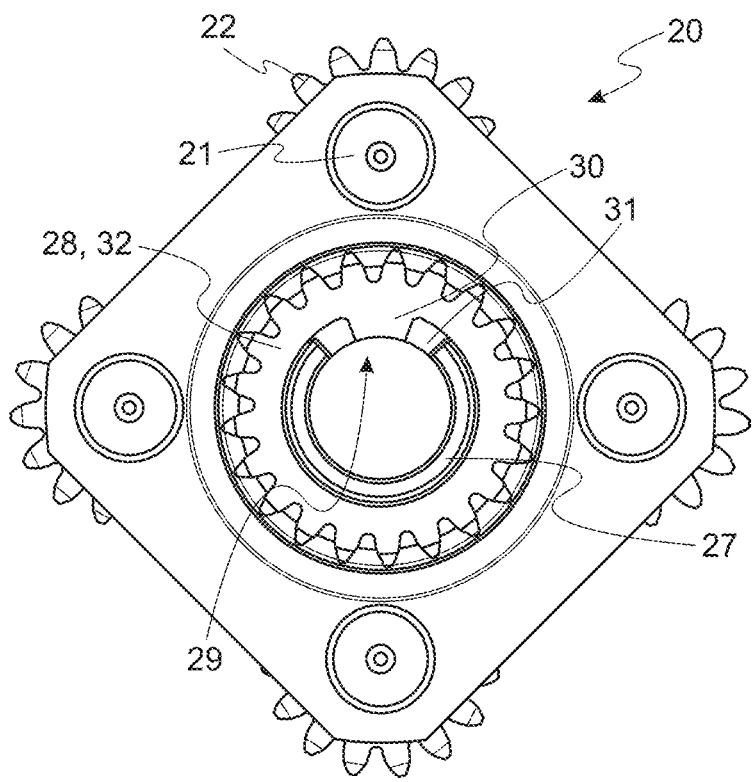
FIG. 3 shows an end view of the planetary gear assembly of FIGS. 2A and 2B.
Figure 4:
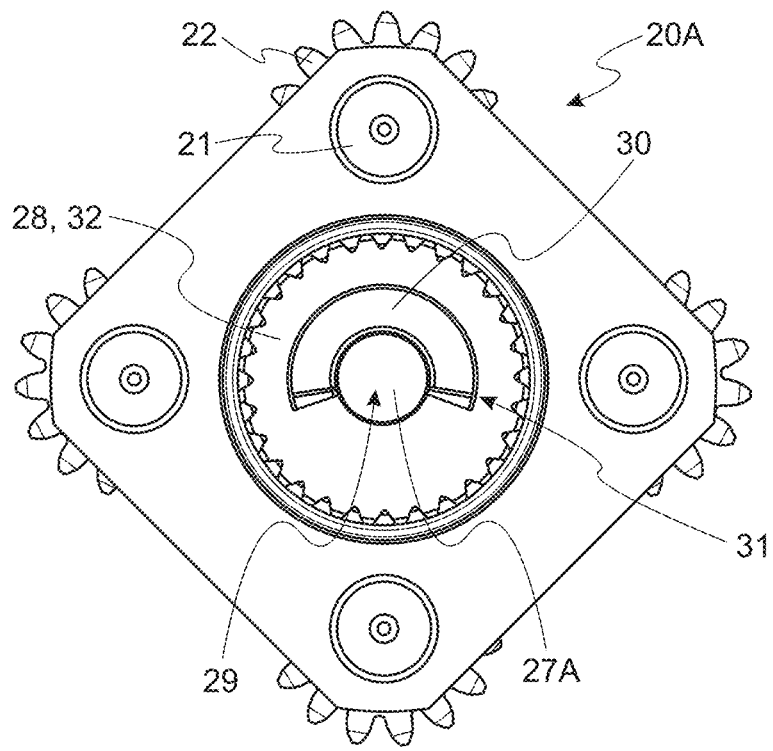
FIG. 4 shows an end view of another planetary gear assembly.

With particular reference to FIGS. 3 and 4, in examples each stage may comprise a different predetermined or set angular offset. For example, each planetary gear assembly 20, 20A and the motor 40 may be configured with a different angular gap through a different sized slot 29, 49 and/or a different sized projection 30, 50. The system (e.g., the controller) may then be used to determine not only if a permitted failure has occurred, but also how many stages of a multistage epicyclic gearbox have failed, and/or which stages have failed. For example, a motor 40 may be configured with a three degree offset, a first planetary gear assembly 20 may be configured with a four degree offset, and a second planetary gear assembly 20 may be configured with a five degree offset. Based on a finding of an eight degree offset, the controller may then determine that both the motor 40 and the second planetary gear assembly 20 have had permitted failures (3+5=8), but that the first planetary gear assembly 20 is still fully functional. Thus, the difference between the position of the motor 40 and the output shaft 18 can be used to determine where a permitted failure has occurred and/or how many of the stages have had permitted failures.

This information may be useful for repair and maintenance operations as an operator would know which planetary gear assemblies 20 need to be replaced before examining the actuator 10. It may also be useful for tracking the permitted failures and for scheduling maintenance operations. On detection of one or more permitted failures, the system (e.g., the positional controller setting the position of the rotor 42) may also be configured to recalibrate itself to compensate for the loss of movement caused by each accumulated angular offset.

The one or more sensors 14 may comprise any suitable sensors for determining the relative positions of the output shaft 18 of the actuator 10 and the position (or set position) of the driver (e.g., a set or controlled position of the rotor 42). Suitable sensors include resistive sensors, optical sensors (e.g., visible or IR), rotary encoders, computer vision-based techniques, hydraulic pressure sensors and magnetic sensors such as hall sensors. In examples, the one or more sensors may include a pair of sensors to respectively determine the position of the rotor 42 and the position of the output shaft 18. A first sensor may be integral to the motor 40 (e.g., a hall sensor). Such sensors are typically an integral part of motors 40 which are used in electromechanical actuators (e.g., as part of an input or position control system which sets the position of the rotor 42 relative to the stator 41) and so this existing infrastructure can be used. A sensor 14 for determining the position of the output shaft 18 may be mounted in any suitable position.

A sensor for determining the position of the output shaft 18 may be positioned with the motor 40 (e.g., on the input side of the actuator 10). This allows positioning of all the electronics and accompanying electronic connectors (e.g., a motor connector 16, and a sensor connector 17) to be co-located, and can also reduce the risk of damage to the electronics by mechanical interaction or shock at the output side (e.g., at the output shaft 18) of the actuator 10. In examples, the position of the output shaft 18 may be monitored by the provision of hollow second transmission shafts 27, 47 (see, e.g., FIG. 3). For example, each of the second transmission shafts 27, 47 of the motor 40 and the planetary gear assemblies 20 (if any) between the motor 40 and output shaft 18 of the actuator 10 may be hollow such that an axial channel is provided along the axis of rotation A. A final or end second transmission shaft 27A directly associated with the output shaft 18, or the output shaft 18 itself, may be closed (e.g., sealing the interior of the actuator 10). The position of the output shaft 18 (or a second transmission shaft 27A directly associated with the output shaft 18) may be monitored via the axial channel. For example, a laser or other optical sensor may be used to detect the position of the output shaft 18 or a final second transmission shaft 27A from the input side of the actuator 10 (from the position of the motor.

In the example shown in FIG. 1, a feedback shaft 13 is provided running coaxially with each of the first and second transmission shafts 25, 27, 45, 47 (e.g., feedback shaft 13 runs through the middle of the first and second gear carriers 24, 26) and is connected to a final or end second transmission shaft 27A. The feedback shaft 13 may be associated with a dedicated position sensor (e.g., a hall sensor) on the input/motor side of the actuator 10. Alternatively, a sensor may be positioned between the feedback shaft 13 and the rotor 42 to measure their positions relative to each other. The feedback shaft 13 and associated sensor 14 may be removed to allow for inspection of the various stages of the actuator 10 via the axial channel.

Although this disclosure has been described in terms of preferred examples, it should be understood that these examples are illustrative only and modifications and alterations are possible within the scope of the claims.

The invention claimed is:

1. A planetary gear assembly for an actuator comprising:
   a first gear carrier including a first transmission shaft mounted for rotation around an axis of rotation (A);
   a second gear carrier including a second transmission shaft mounted for rotation around the axis of rotation (A);
   a plurality of pins circumferentially spaced around the axis of rotation (A), wherein the plurality of pins are mounted to the first gear carrier and the second gear carrier;
   a plurality of planetary gears mounted to the plurality of pins, wherein each respective planetary gear is mounted to a respective pin for rotation about a respective pin axis; and
   an output shaft;
   wherein the first transmission shaft is secured to the output shaft for rotation with the output shaft around the axis of rotation (A);
   wherein the output shaft comprises a first engagement feature, and wherein the second transmission shaft comprises a second engagement feature arranged to engage with the first engagement feature upon rotation of the second transmission shaft relative to the output shaft;
wherein the first engagement feature is separated from engagement with the second engagement feature.

2. The planetary gear assembly according to claim 1, wherein the output shaft comprises an output gear.

3. The planetary gear assembly according to claim 1, wherein the output shaft is integral with the first transmission shaft.

4. The planetary gear assembly according to claim 1, wherein the output shaft is radially exterior to the second transmission shaft.

5. The planetary gear assembly according to claim 1, wherein:
one of the first engagement feature and the second engagement feature comprises a projection; and
the other of the first engagement feature and the second engagement feature comprises a circumferential slot;
wherein an angular gap extends between the projection and the circumferential slot.

6. An actuator comprising:
the planetary gear assembly according to claim 1.

7. The actuator according to claim 6, further comprising:
an actuation shaft;
an electric motor having a stator and a rotor;
wherein the rotor is connected to a sun gear;
wherein the sun gear drives the plurality of planetary gears around the axis of rotation (A); and
wherein the output shaft is connected to the actuation shaft.

8. The actuator according to claim 6, comprising:
an actuation shaft;
the electric motor assembly;
wherein and output shaft of the electric motor assembly is connected to a sun gear;
wherein the sun gear drives the plurality of planetary gears around the axis of rotation (A); and
wherein the output shaft of the planetary gear assembly is connected to the actuation shaft.

9. The actuator according to claim 6, further comprising:
one or more sensors configured to determine the rotational position of the actuation shaft relative to the rotor.

10. The actuator according to claim 9, further comprising:
a controller configured to determine that the first transmission shaft of the planetary gear assembly has failed and that the second transmission shaft of the planetary gear assembly is engaged with, and transmits drive to, the actuation shaft based on the determined rotational position the actuation shaft.

11. The actuator according to claim 6, further comprising a plurality of planetary gear assemblies, wherein separation of each respective first and second engagement features of each planetary gear assembly is different.

12. The actuator according to claim 6, further comprising:
a feedback shaft secured to the actuation shaft, wherein the feedback shaft is coaxial with the rotor and a portion of the feedback shaft extends through a portion of the rotor.

13. An electric motor assembly for an actuator comprising:
a stator;
a rotor mounted for rotation with respect to the stator around an axis of rotation (A);
a first transmission shaft mounted to the rotor;
a second transmission shaft mounted to the rotor; and
an output shaft;
wherein the rotor is configured to drive the first transmission shaft and second transmission shaft around the axis of rotation (A);
wherein the first transmission shaft is secured to the output shaft for rotation with the output shaft around the axis of rotation (A);
wherein the output shaft comprises a first engagement feature, and wherein the second transmission shaft comprises a second engagement feature arranged to engage with the first engagement feature upon rotation of the second transmission shaft relative to the output shaft;
wherein the first engagement feature is separated from engagement with the second engagement feature.

14. The electric motor assembly according to claim 13, further comprising:
one or more fasteners securing the first transmission shaft and the second transmission shaft to the rotor.

15. The electric motor assembly according to claim 13, wherein the output shaft comprises an output gear.

16. The electric motor assembly according to claim 13, wherein the output shaft is integral with the first transmission shaft.

17. The electric motor assembly according to claim 13, wherein the output shaft is radially exterior to the second transmission shaft.

18. The electric motor assembly according to claim 13, wherein:
one of the first engagement feature and the second engagement feature comprises a projection; and
the other of the first engagement feature and the second engagement feature comprises a circumferential slot;
wherein an angular gap extends between the projection and the circumferential slot.

19. A method for detecting a permitted failure condition of an actuator, the actuator comprising:
a first transmission shaft mounted to a driver;
a second transmission shaft mounted to the driver; and
an output shaft;
wherein the output shaft comprises a first engagement feature and wherein the second transmission shaft comprises a second engagement feature for engaging with the first engagement feature;
wherein, in a functioning condition, the first transmission shaft transmits drive from the driver to the output shaft, the second transmission shaft does not transmit drive from the driver to the output shaft, and the first engagement feature is rotationally separated from the second engagement feature by a predetermined angular gap; and
wherein, in the permitted failure condition, the first transmission shaft does not transmit drive from the driver to the output shaft, the second transmission shaft transmits drive from the driver to the output shaft, and the first engagement feature engages the second engagement feature to transmit drive from the driver to the output shaft;
the method comprising:
determining a position of the output shaft relative to a position of the driver;
comparing the determined position of the output shaft with an expected position of the output shaft;
determining that the permitted failure condition has occurred if the determined position of the output shaft and the expected position of the output shaft are offset from each other by the predetermined angular gap.

\* \* \* \* \*